(12) United States Patent
Bayer et al.

(10) Patent No.: US 6,406,053 B1
(45) Date of Patent: Jun. 18, 2002

(54) PYROTECHNIC GAS GENERATOR

(75) Inventors: Karl Bayer, Berg; Rudolf Hiltner, Furth, both of (DE)

(73) Assignee: Dynamit Nobel GmbH Explosivstoff- und Systemtechnik, Troisdorf (DE)

( * ) Notice: Subject to any disclaimer, the term of this patent is extended or adjusted under 35 U.S.C. 154(b) by 0 days.

(21) Appl. No.: 09/582,347

(22) PCT Filed: Dec. 10, 1998

(86) PCT No.: PCT/EP98/08071

§ 371 (c)(1),
(2), (4) Date: Sep. 15, 2000

(87) PCT Pub. No.: WO99/33685

PCT Pub. Date: Jul. 8, 1999

(30) Foreign Application Priority Data

Dec. 23, 1997 (DE) .......................... 197 57 478

(51) Int. Cl.[7] .............................................. B60R 21/26
(52) U.S. Cl. .................... 280/530; 280/736; 280/741
(58) Field of Search ................ 102/530, 531; 280/736, 741

(56) References Cited

U.S. PATENT DOCUMENTS 3,813,112 A * 5/1974 Hermann .................. 280/741
6,019,389 A * 2/2000 Burgi et al. ............... 280/736
6,168,200 B1 * 1/2001 Greist, III et al. ......... 280/736

FOREIGN PATENT DOCUMENTS

| EP | 6168200 | * | 5/1997 |
| EP | 879739 | * | 11/1998 |
| WO | WO 97/16695 | * | 5/1997 |

* cited by examiner

Primary Examiner—Harold J. Tudor
(74) Attorney, Agent, or Firm—Antonelli, Terry, Stout & Kraus, LLP

(57) ABSTRACT

The invention relates to a pyrotechnic gas generator, especially for passive restraint systems in motor vehicles, comprising at least two independent loading spaces (1a, 1b) which contain fuel (2) and to each of which an ignition unit (3a, 3b) is assigned which can be controlled independently of each other. All loading spaces (1a, 1b) are connected to a shared expansion chamber (4). To avoid firing from the expansion chamber to the loading spaces in a small, low-weight gas generator, the invention provides for a shared lid (5), configured as a membrane, to be arranged between the loading spaces (1a, 1b) and the expansion chamber (4), for a first perforated sheet-metal disk (6) to be positioned in each loading space (1a, 1b) on which the lid (5) is able to rest, for a second perforated sheet-metal disk (7) to be positioned outside the loading spaces (1a, 1b) directly above the lid (5), for the lid (5) to be held tightly between the first (6) and second (7) perforated sheet-metal disk and for the first perforated sheet-metal disk (6) to have smaller perforations (8a) than the second perforated sheet-metal disk (7).

16 Claims, 4 Drawing Sheets

PYROTECHNIC GAS GENERATOR

BACKGROUND OF THE INVENTION

The invention relates to a pyrotechnic gas generator.

An arrangement for the multi-stage ignition of a pyrotechnic gas generator for passive restraint systems in motor vehicles is known from the generic EP 0 773 145 A2. The gas generator consists of two charging chambers independent of each other, in each of which fuel is contained and to which a respective ignition unit is assigned. These ignition units are to be ignited independently of each other. Both charging chambers are connected to a common expansion chamber.

SUMMARY OF THE INVENTION

The object underlying the invention is to design a pyrotechnic gas generator in such a way that, with small size and little weight, all in all low manufacturing costs are achieved. In this respect firing from the expansion chamber over into the individual charging chambers is to be prevented.

In accordance with the invention, the object is achieved in that a common cover constructed as a membrane is arranged between the charging chambers and the expansion chamber, in that a first perforated sheet-metal disc is arranged in each charging chamber, on which disc the cover rests, and in that a second perforated sheet-metal disc is arranged outside the charging chambers directly above the cover, with the cover being clamped between the first and second perforated sheet-metal discs, and in that smaller perforations are arranged in the first perforated sheet-metal disc than in the second perforated sheet-metal disc.

The claimed sandwich construction of the first perforated sheet-metal disc—membrane—the second perforated sheet-metal disc, with the larger perforations in the second perforated sheet-metal disc, has the advantage that, with a certain operating pressure in the charging chambers, the membrane is perforated and the gas vapours of the fuel can be sent to the expansion chamber. However, an unintentional firing from the expansion chamber over into the charging chamber is not possible if the thickness of the membrane is dimensioned in such a way that it is not opened at the relatively small perforations of the first perforated sheet-metal disc.

In a preferred embodiment the perforations in the first perforated sheet-metal disc have a diameter between 1 mm and 5 mm, the perforations in the second perforated sheet-metal disc a diameter between 6 mm and 10 mm and the cover or the membrane has a thickness greater than 0.1 and up to 0.5 mm. However, other values can also be meaningful here. If, for example, the cover or the membrane is thicker than 0.1 to 0.5 mm, then the diameter of the perforations in the two perforated sheet-metal discs must likewise be enlarged.

However, it is important that it is possible to open the cover from "the inside", that is to say from the charging chamber, but not from an expansion chamber into the charging chamber.

Advantageously, the charging chambers are arranged in a one-part charging container, with the base of the charging container being constructed as a generator structure. This means that the base is more stable than the side walls.

In order to avoid a firing from one charging chamber over into the other, a groove is preferably arranged in the walls of the charging chambers or in the charging container, in which groove the cover is supported in a form-locking manner. For a better hold, advantageously an additional clamping element, for example a ring, is inserted into the groove. This clamping element can even be welded in or glued in, for example. For the further improvement of the sealing, the cover is preferably constructed with the wall of the charging chambers or with the charging container as a flange, that is to say it is flanged. As a result of these measures a labyrinth seal is created. According to requirements, the groove can even be placed around only one charging chamber.

Ignition units are inserted in the base of the charging container, preferably projecting into the charging chambers. For this purpose, the floor can be appropriately curved inwards or the ignition units are inserted by way of a sealing element.

The charging container is, according to the invention, surrounded by a housing which is connected to the charging container by means of clinching and/or flanging.

The charging container preferably consists of aluminium and is manufactured by the extrusion method.

The expansion chamber is meaningfully connected to a filter area concentrically encompassing the charging container, and the filter area is connected to an air pocket via openings and in this way forms an air bag.

BRIEF DESCRIPTION OF THE INVENTION

Further features of the invention are evident from the figures which are described in the following.

DETAILED DESCRIPTION OF THE PREFERRED EMBODIMENTS

Figure 1:
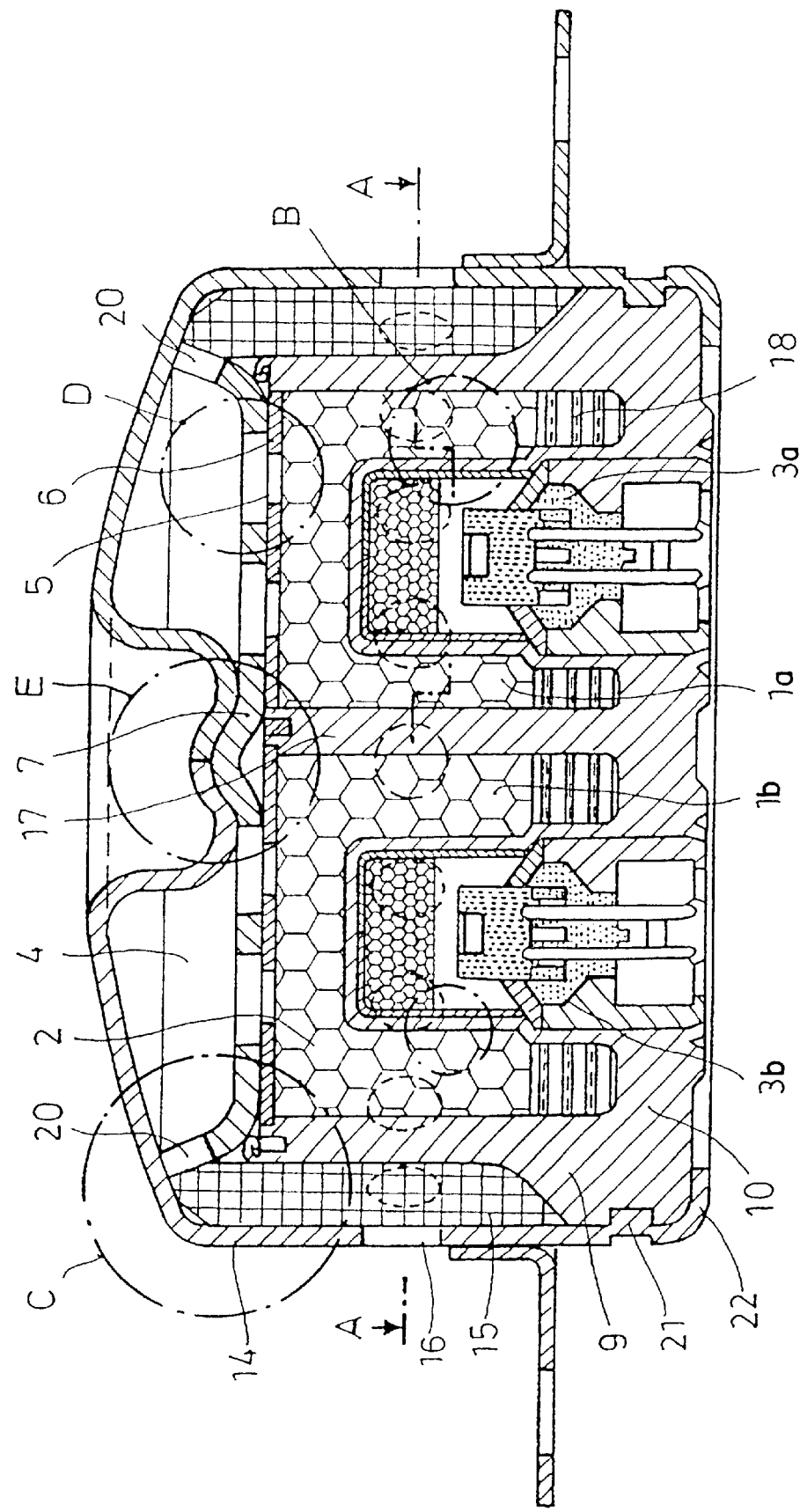
FIG. 1 shows a gas generator in accordance with the invention in section.
Figure 2:
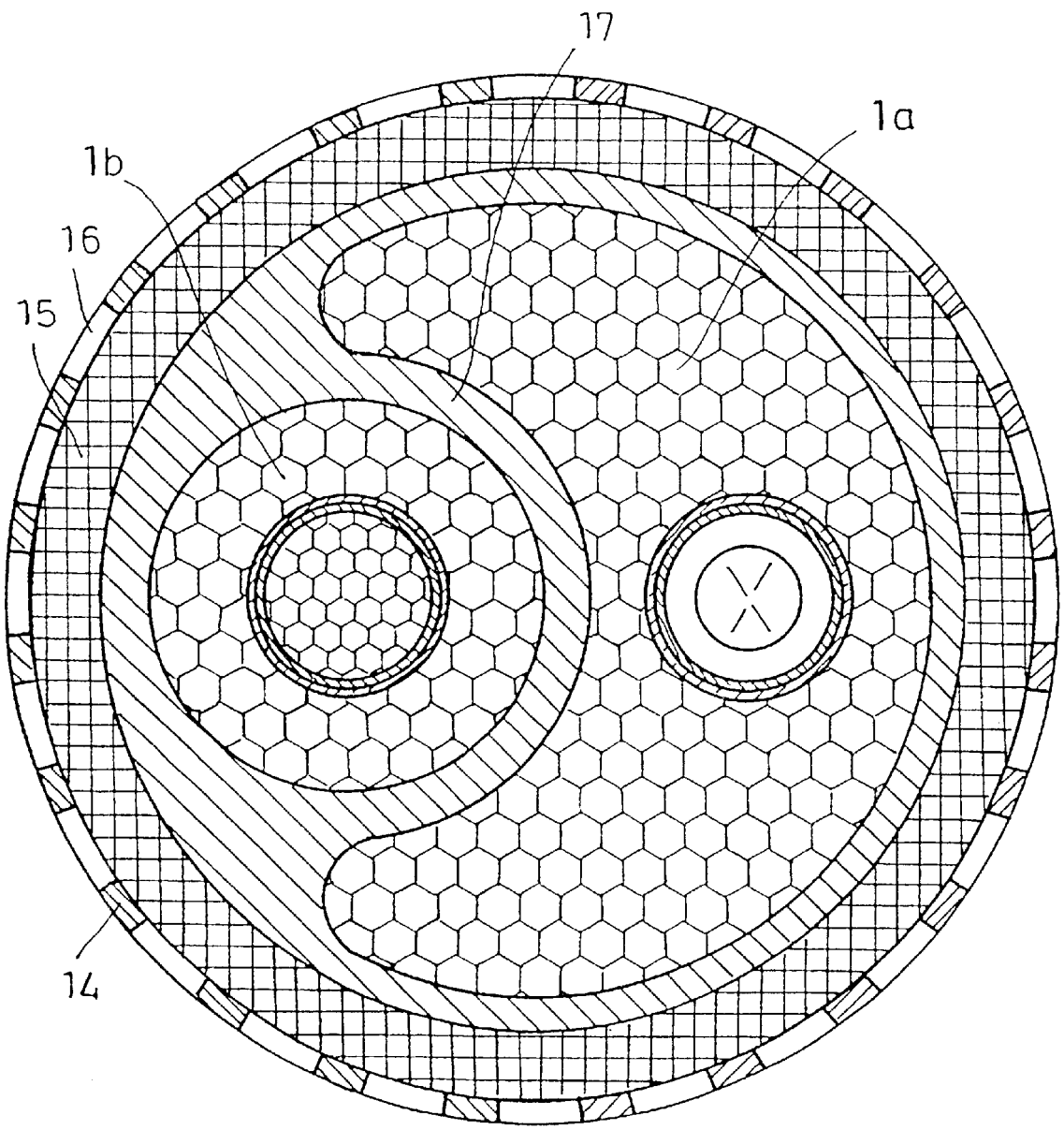
FIG. 2 shows a section along the line A—A in FIG. 1.

FIG. 1 shows, in section, a pyrotechnic gas generator in accordance with the invention and FIG. 2 shows a section along the line A—A in FIG. 1.

The gas generator consists of a one-part charging container 9, the base 10 of which is constructed as a generator structure. Two charging chambers 1a, 1b are arranged in the charging container 9, which are separated from each other by a dividing wall 17. Two ignition units 3a, 3b extending into the charging chambers 1a, 1b are inserted into the base 10 of the charging container 9. The base 10 of the charging container 9 is curved inwards for the incorporation of the ignition units 3a, 3b into the charging chambers 1a, 1b and in this way forms an insertion region. The ignition units 3a, 3b fill this ignition region completely and consist substantially of a connector plug, a connector element, a detonating agent and an amplification charge. Such an ignition unit is described, for example, in EP 0 618 424 B1. However, any other ignition unit can also be used.

Figure 3:
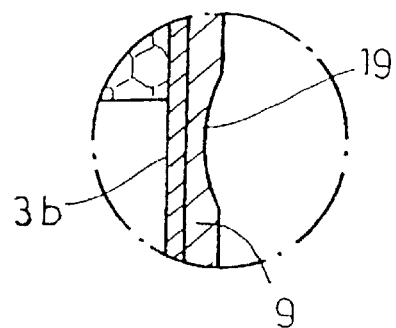
FIG. 3 shows the section B of FIG. 1 on an enlarged scale.

The ignition units 3a, 3b are fixed in the charging container 9 as a result of notching and bending the base 10. FIG. 3 shows the section B of FIG. 1 on an enlarged scale. The charging container 9 or the wall of the insertion region is constructed in one region as a predetermined breaking position 19. On the ignition of the ignition units 3a, 3b, the container wall tears open at this predetermined breaking point 19 and the ignition beam strikes the fuel 2 arranged in the charging chambers.

Figure 5:
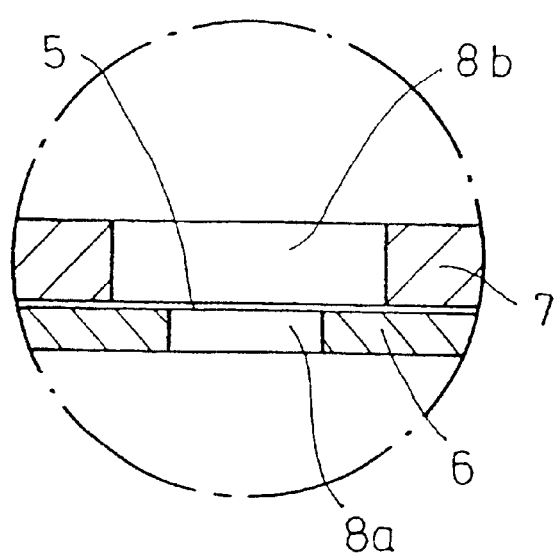
FIG. 5 shows the section D of FIG. 1 on an enlarged scale.
Figure 6:
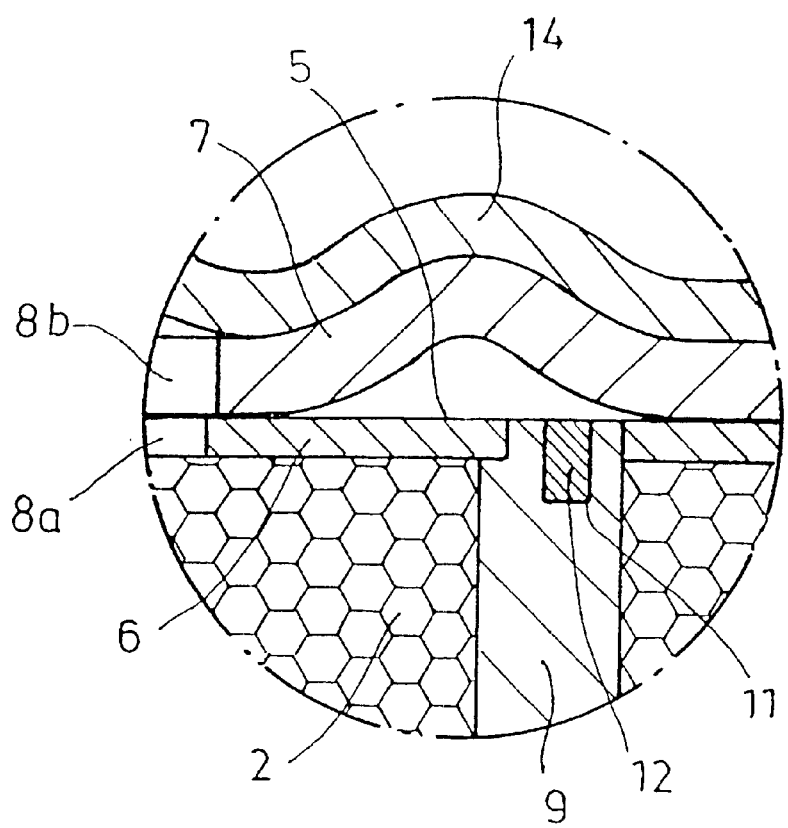
FIG. 6 shows the section E of FIG. 1 on an enlarged scale.

The charging chamber 1a is constructed in a sickle shape and encloses, at one side, the cylindrical smaller charging chamber 1b. The charging chambers 1a, 1b are filled completely with fuel 2 in the form of pellets, with a structure 18 being placed on the base of the charging chambers as volume equalization. In accordance with the invention, a membrane forms the cover 5, the membrane being clamped between a first 6 and a second perforated sheet-metal disc 7. The assembly of this sandwich type of construction of perforated sheet-metal disc-cover-perforated sheet-metal disc will be shown later in detail with reference to FIGS. 4–6.

Both covered ends of the charging chambers 1a, 1b limit a common expansion chamber 4 which in turn is connected by way of openings 20 in the second perforated sheet-metal disc 7, which is constructed in the shape of a plate, to a filter region 15 which lies concentrically around the loading chamber 9. This filter region 15 is connected by means of openings 16 in the wall of the housing 14 to an air pocket which is not shown.

The housing 14 completely surrounds the charging container 9 apart from its floor 10 and is connected to it by way of clinching 21 and flanging 22. The housing 14 projects into the expansion chamber 4 and in this way forms a support for the second perforated sheet-metal disc 7. The plate-shaped edge of the second perforated sheet-metal disc 7 likewise forms a support for the housing 14.

Figure 4:
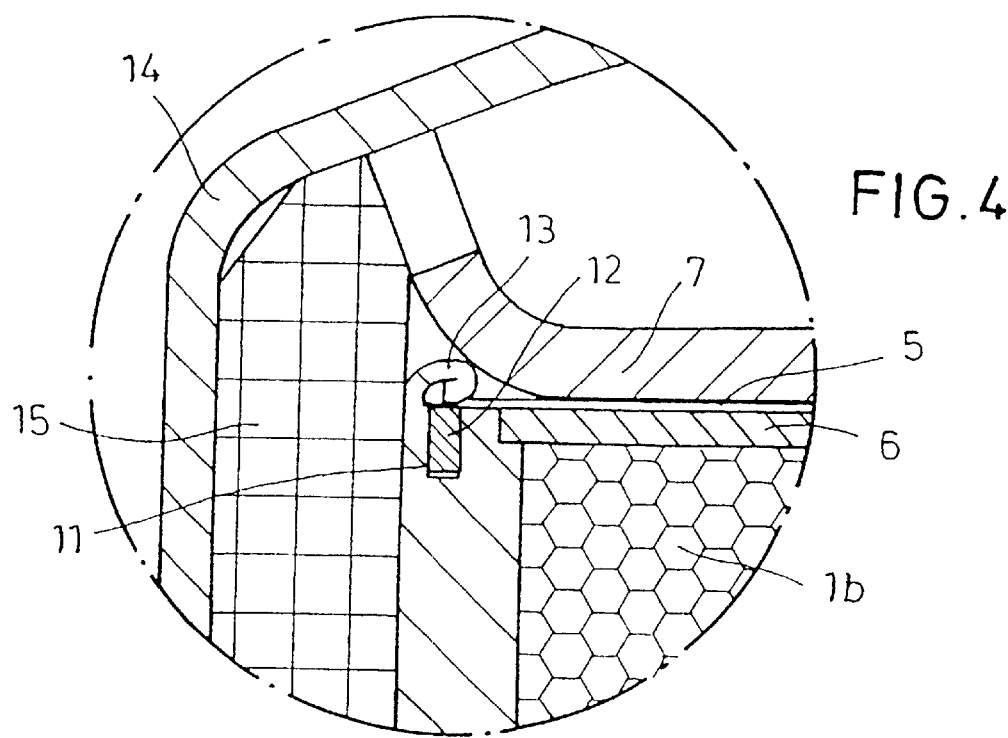
FIG. 4 shows the section C of FIG. 1 on an enlarged scale.

As already explained, the cover 5, constructed as a membrane, is clamped between the first 6 and the second perforated sheet-metal disc 7. This can be seen well in FIGS. 4–6, with FIG. 4 showing section C, FIG. 5 section D and FIG. 6 section E of FIG. 1 on an enlarged scale.

The first perforated sheet-metal disc 6 is arranged in a form-locking manner in the respective charging chamber 1a, 1b and forms a support for the cover 5. The second perforated sheet-metal disc 7, which covers the entire cover 5 in one part, is located outside the charging chambers 1a, 1b directly above the cover 5.

As the name perforated sheet-metal disc 6, 7 already states, these consist of sheet metal with a plurality of holes or perforations 8a, 8b. The charging container 9 is manufactured from aluminium by the extrusion method.

An essential feature of the invention is that the perforations 8a in the first perforated sheet-metal disc 6 are smaller than the perforations 8b in the second perforated sheet-metal disc 7. This is shown most clearly in FIG. 5. The perforations 8a in the first perforated sheet-metal disc preferably have a diameter between 1 mm and 5 mm and the perforations 8b in the second perforated sheet-metal disc 7 a diameter between 6 mm and 10 mm. The cover 5 constructed as a membrane preferably has a thickness between 0.1 mm and 0.5 mm. The cover 5 is, for example, a gas-tight foil, for example an aluminium foil.

In order to seal the charging chambers, a groove 11 is formed in the wall of the charging chamber 1b, in which the cover 5 is supported in a form-locking manner. The figures show an embodiment where the groove 11 is only sunk in the wall of the charging chamber 1b. However, the groove 11 can also additionally be sunk in the wall of the charging chamber 1a or only there and not in the wall of the charging chamber 1b.

The cover 5 is inserted in a form-locking manner into this groove 11 by way of an additional clamping element 12, with the clamping element 12 being a ring in this case, because the charging chamber 1b is constructed in the shape of a cylinder and the cover-side end therefore forms a circle.

In addition, the cover 5 is constructed with the wall of the charging chamber 1b and the charging container 9 has a flange 13 which also undertakes the sealing function against environmental influences, such as dampness. This is shown most clearly in FIG. 4. A labyrinth seal is created by way of the groove 11 in conjunction with the clamping element 12 and possibly the flange 13.

As a result of the large number of small perforations 8a in the first perforated sheet-metal disc 6, the gas vapours released upon combustion of the fuel 2 can flow through it without a damming effect. Directly above the cover 5 constructed as a membrane is the second perforated sheet-metal disc 7 with larger perforations 8b. The cover 5 is penetrated at these perforations 8b under a certain operating pressure, and the gas vapours reach the expansion chamber 4. An unintentional firing from the expansion chamber 4 over into the other charging chamber is not possible because the thickness of the cover 5 has a value such that it is not opened at the relatively small perforation 8a of the first perforated sheet-metal disc 6. A gas leakage from one charging chamber to the other is prevented by the labyrinth seal (groove 11) already described above.

The gas vapours flow out of the expansion chamber 4 by way of openings 20 in the second perforated sheet-metal disc 7 into the filter area 15 in which they are cooled and cleaned. They then leave the gas generator by way of the openings 16 in the housing 14.

What is claimed is:

1. Pyrotechnic gas generator, including at least two charging chambers, independent of each other, in which fuel is arranged, and to each of which an ignition unit is assigned, which chambers are controllable independently of each other, and all charging chambers are connected to a common expansion chamber, characterized in that a common lid formed as a membrane is arranged between the charging chambers and the expansion chamber, in that a first perforated sheet-metal disc is arranged in each charging chamber, with the lid resting on the first sheet-metal disks, in that a second perforated sheet-metal disc is arranged away from the charging chambers directly above the lid, with the lid being clamped between the first and the second perforated sheet-metal discs, and in that smaller perforations are arranged in the first perforated sheet-metal discs than in the second perforated sheet-metal disc.

2. Gas generator according to claim 1, characterized in that the perforations in the first perforated sheet-metal disc have a diameter between 1 mm and 5 mm.

3. Gas generator according to claim 1, characterized in that the perforations in the second perforated sheet-metal disc have a diameter between 6 mm and 10 mm.

4. Gas generator according to claim 1, characterized in that the lid has a thickness between 0.1 mm and 0.5 mm.

5. Gas generator according to claim 1, characterized in that the charging chambers are arranged in a one-part charging container and the base of the container is constructed as a generator structure.

6. Gas generator according to claim 5, characterized in that a groove is arranged in the walls of the one-part charging container, in which groove the lid is supported in a form-locking manner.

7. Gas generator according to claim 6, characterized in that an additional clamping element is inserted into the groove.

8. Gas generator according to claim 7, characterized in that the clamping element is a ring.

9. Gas generator according to claim 5, characterized in that an upper end of the wall of the charging chambers and the one-part charging container is constructed as a flange, and the flange seals the lid.

10. Gas generator according to claim 5, characterized in that ignition units are inserted in the base of the one-part charging container, projecting into the charging chambers.

11. Gas generator according to claim 5, characterized in that the one-part charging container is surrounded by a housing which is connected to the one-part charging container by way of clinching and/or flanging.

12. Gas generator according to claim 5, characterized in that the one-part charging container consists of aluminum and is manufactured with an extrusion method.

13. Gas generator according to claim 5, characterized in that the expansion chamber is connected to a filter area concentrically encompassing the one-part charging container, and the filter area is connected to an air pocket by way of openings.

14. Gas generator according to claim 1, characterized in that a groove is arranged in the walls of the charging chambers, in which groove the lid is supported in a form-locking manner.

15. Gas generator according to claim 14, characterized in that an additional clamping element is inserted into the groove.

16. Gas generator according to claim 15, characterized in that the clamping element is a ring.

* * * * *